United States Patent
Nagayama

(10) Patent No.: US 11,465,489 B2
(45) Date of Patent: Oct. 11, 2022

(54) IN-WHEEL MOTOR UNIT COUPLING STRUCTURE

(71) Applicant: TOYOTA JIDOSHA KABUSHIKI KAISHA, Toyota (JP)

(72) Inventor: Makoto Nagayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/835,703

(22) Filed: Mar. 31, 2020

(65) Prior Publication Data
US 2020/0331339 A1   Oct. 22, 2020

(30) Foreign Application Priority Data

Apr. 16, 2019 (JP) .............................. JP2019-078098

(51) Int. Cl.
  *B60K 7/00* (2006.01)
  *B60G 15/06* (2006.01)
  *B62D 7/18* (2006.01)

(52) U.S. Cl.
  CPC .......... *B60K 7/0007* (2013.01); *B60G 15/062* (2013.01); *B62D 7/18* (2013.01)

(58) Field of Classification Search
  CPC .......... B60K 7/0007; B60K 2007/0038; B60K 2007/0061; B60G 2204/182
  See application file for complete search history.

(56) References Cited

U.S. PATENT DOCUMENTS

| | | | | |
|---|---|---|---|---|
| 7,528,518 B2* | 5/2009 | Maeda | ...................... | H02K 7/14 310/67 R |
| 7,556,111 B2* | 7/2009 | Oshidari | .................. | B60G 3/14 180/65.51 |
| 8,459,386 B2* | 6/2013 | Pickholz | .............. | B60K 7/0007 180/65.51 |
| 2007/0234559 A1* | 10/2007 | Tokuda | ............... | B60R 16/0215 29/755 |
| 2009/0166112 A1* | 7/2009 | Yoshino | ............... | B60K 17/046 180/65.51 |
| 2015/0137669 A1* | 5/2015 | Lampic | ................ | B60K 7/0007 310/67 R |
| 2019/0070950 A1 | 3/2019 | Adachi | | |

FOREIGN PATENT DOCUMENTS

| | | | | |
|---|---|---|---|---|
| CN | 107128162 A | * | 9/2017 | ........... B60K 7/0007 |
| JP | 2009-196525 A | | 9/2009 | |
| JP | 2013-163401 A | | 8/2013 | |
| JP | 2016-190572 A | | 11/2016 | |
| JP | 2019-43412 A | | 3/2019 | |

* cited by examiner

*Primary Examiner* — Frank B Vanaman
(74) *Attorney, Agent, or Firm* — Sughrue Mion, PLLC

(57) ABSTRACT

An in-wheel motor unit coupling structure includes an in-wheel motor unit and a shock absorber. The in-wheel motor unit is disposed inside a wheel of a vehicle. The in-wheel motor unit is configured to support the wheel such that the wheel is rotatable. The in-wheel motor unit includes an electric motor that serves as a rotational driving source of the wheel. The shock absorber is coupled to the in-wheel motor unit. The shock absorber is a component of a vehicle suspension. A lower end portion of the shock absorber is fastened to a vehicle center side, in a vehicle width direction, of a motor part so as to be pressed against the motor part outward from the vehicle in the vehicle width direction. The motor part is a part in which the electric motor of the in-wheel motor unit is built.

2 Claims, 7 Drawing Sheets

IN-WHEEL MOTOR UNIT COUPLING STRUCTURE

INCORPORATION BY REFERENCE

The disclosure of Japanese Patent Application No. 2019-078098 filed on Apr. 16, 2019 including the specification, drawings and abstract is incorporated herein by reference in its entirety.

BACKGROUND

1. Technical Field

The present disclosure relates to an in-wheel motor unit coupling structure for coupling an in-wheel motor unit to a shock absorber in a vehicle suspension.

2. Description of Related Art

In these days, development of vehicles that are driven by electric motors has been actively performed, and various in-wheel motor units, that is, units each placed in a wheel to support the wheel such that the wheel is rotatable and each including an electric motor that serves as a rotational driving source of the wheel have been studied. Japanese Unexamined Patent Application Publication No. 2013-163401 (JP 2013-163401 A) suggests a coupling structure (hereinafter, which may be simply referred to as in-wheel motor unit coupling structure or coupling structure) for coupling an in-wheel motor unit, which serves as a carrier, to a shock absorber. The in-wheel motor unit and the shock absorber make up a vehicle suspension (hereinafter, which may be simply referred to as suspension).

SUMMARY

With the technique described in JP 2013-163401 A, a lower end portion of the shock absorber is coupled to a front side of the in-wheel motor unit (hereinafter, which may be simply referred to as unit), more specifically, a front side of a motor part that is a part in which an electric motor of the unit is disposed. For this reason, space for disposing a brake caliper that is a kind of other elements to be disposed in a wheel is limited, and, in addition, work, such as maintenance of the brake caliper, is made difficult. The lower end portion of the shock absorber is relatively significantly shifted forward with respect to a rotation axis (hereinafter, which may be referred to as wheel rotation axis) of the wheel. At the time of bounding or rebounding, relatively large force acts on the shock absorber in a direction that intersects with the axis of the shock absorber (hereinafter, which may be referred to as absorber axis). In other words, relatively large force that attempts to bend the shock absorber acts. In consideration of the action of such a force, the strength of the shock absorber needs to be increased. Furthermore, the technique described in JP 2013-163401 A is a technique intended for a steer wheel. At the time of turning a tire-wheel assembly, the lower end portion of the shock absorber rotates at a relatively large radius around a kingpin axis. For this reason, relatively large space needs to be ensured for the rotation. The present disclosure provides a coupling structure that is able to improve the practicality of an in-wheel motor unit in a vehicle suspension.

In an in-wheel motor unit coupling structure of an aspect of the present disclosure, a lower end portion of a shock absorber is fastened to an in-wheel motor unit on a vehicle center side, in a vehicle width direction, of a motor part so as to be pressed against the motor part outward from the vehicle in the vehicle width direction. The motor part is a part in which the electric motor of the in-wheel motor unit is built.

With the coupling structure of the present disclosure, since the lower end portion of the shock absorber is fastened to the vehicle center side, in the vehicle width direction, of the motor part, space for disposing another element that is disposed inside the wheel is less limited, so work, such as maintenance of another element, can be relatively easily performed. In addition, the axis of the shock absorber can be brought close to a wheel rotation axis, so a force that acts on the shock absorber in a direction that intersects with the absorber axis can be relatively reduced. Furthermore, in a suspension intended for a steer wheel, a rotation radius of the lower end portion of the shock absorber around a kingpin axis at the time of turning a tire-wheel assembly can be relatively reduced.

Additionally, with the coupling structure of the aspect of the present disclosure, the lower end portion of the shock absorber is fastened to the motor part of the unit so as to be pressed against the motor part, in other words, the lower end portion of the shock absorber is fastened to the motor part so as to be directly in close contact with the motor part. When the shock absorber and the unit are firmly coupled and a force that acts on the shock absorber is directly received by the unit, the stiffness of the coupling structure can be sufficiently ensured, and reliability on the strength of the coupling structure is high.

The in-wheel motor unit coupling structure that is the aspect of the present disclosure includes an in-wheel motor unit and a shock absorber. The in-wheel motor unit is disposed inside a wheel of a vehicle and supports the wheel such that the wheel is rotatable. The in-wheel motor unit includes an electric motor that serves as a rotational driving source of the wheel. The shock absorber is coupled to the in-wheel motor unit. The shock absorber is a component of a vehicle suspension. A lower end portion of the shock absorber is fastened to a vehicle center side, in a vehicle width direction, of a motor part so as to be pressed against the motor part outward from the vehicle in the vehicle width direction. The motor part is a part in which the electric motor of the in-wheel motor unit is built.

The coupling structure of the above aspect may be regarded as a vehicle suspension of another aspect. The vehicle suspension of that aspect includes an in-wheel motor unit and a shock absorber. The in-wheel motor unit is disposed inside a wheel. The in-wheel motor unit functions as a carrier that supports the wheel such that the wheel is rotatable. The in-wheel motor unit includes an electric motor that serves as a rotational driving source of the wheel. The shock absorber is coupled to the in-wheel motor unit. A lower end portion of the shock absorber is fastened to a vehicle center side, in a vehicle width direction, of a motor part so as to be pressed against the motor part outward from the vehicle in the vehicle width direction. The motor part is a part in which the electric motor of the in-wheel motor unit is built.

In the above-described coupling structure or vehicle suspension, the in-wheel motor unit functions as a carrier that supports a tire-wheel assembly while permitting the up and down motion of the tire-wheel assembly according to bounding or rebounding. As long as the unit functions as a carrier, the type of the suspension in the aspect is not limited. For example, the suspension may be generally a strut (MacPherson type) suspension in which a lower end portion of a shock absorber is coupled to a steering knuckle that serves as a carrier. Because a strut suspension is intended for a steer wheel, with the strut suspension, the above-described advantageous effect from the above aspect, more specifically, the advantageous effect that the rotation radius of the lower end portion of the shock absorber around the kingpin axis at the time of turning a tire-wheel assembly can be relatively reduced, can be sufficiently obtained.

In consideration of another element, such as a brake caliper that is placed inside a rim of the wheel, the motor part of the unit may be offset in a vehicle front and rear direction with respect to the wheel rotation axis. From the viewpoint of relatively reducing a force that acts on the shock absorber in a direction that intersects with the absorber axis, an amount of offset of an axis of the shock absorber in side view of the vehicle from the rotation axis of the wheel may be less than or equal to 1/5 of an outside diameter of the wheel. The amount of offset may be defined as a minimum distance in side view of the vehicle between the absorber axis and the rotation axis of the wheel in a state where a tire-wheel assembly is not turned.

The lower end portion of the shock absorber and the motor part may be fastened to each other with a fastening member. As long as firm fastening is possible, the fastening member is not limited. Even when any fastening member is used, pressing of the shock absorber against the motor part may be achieved by using the elastic reaction force of the fastening member from the viewpoint that the structure for pressing is simple.

In consideration of such an advantage that the structure is simple, the fastening member may include a bracket partially joined with the lower end portion of the shock absorber and extending toward the motor part, and the lower end portion of the shock absorber may be fastened to the motor part by fastening an extended end portion of the bracket to the motor part. When such a structure is employed, for example, when a gap is provided between the extended end portion of the bracket and the motor part and the extended end portion of the bracket is fastened to the motor part such that the gap is eliminated while the bracket is elastically deformed, the lower end portion of the shock absorber can be pressed against the motor part by a reaction force caused by the elastic deformation of the bracket.

A mounting seat may be fixedly provided on the motor part against which the lower end portion of the shock absorber is pressed in fastening. In that case, the mounting seat may have a structure that is able to prohibit positional variations of the shock absorber in a direction perpendicular to the absorber axis, mainly, the vehicle front and rear direction, in a state where the lower end portion of the shock absorber is pressed against the mounting seat. Specifically, the mounting seat may include a groove to which the lower end portion of the shock absorber is fitted, more specifically, a groove parallel to the absorber axis in the case where the shock absorber is mounted at an appropriate position. With considerations to the fact that the shock absorber generally has a cylindrical shape, the groove may be, for example, a groove having a U-shape or V-shape in cross section perpendicular to the absorber axis.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an in-wheel motor unit coupling structure that is an embodiment of the present disclosure will be described in detail with reference to the accompanying drawings. The present disclosure may be implemented in various forms with various modifications or improvements based on the knowledge of persons skilled in the art, other than the following embodiment.

Overall Configuration of Vehicle Suspension

Figure 1:
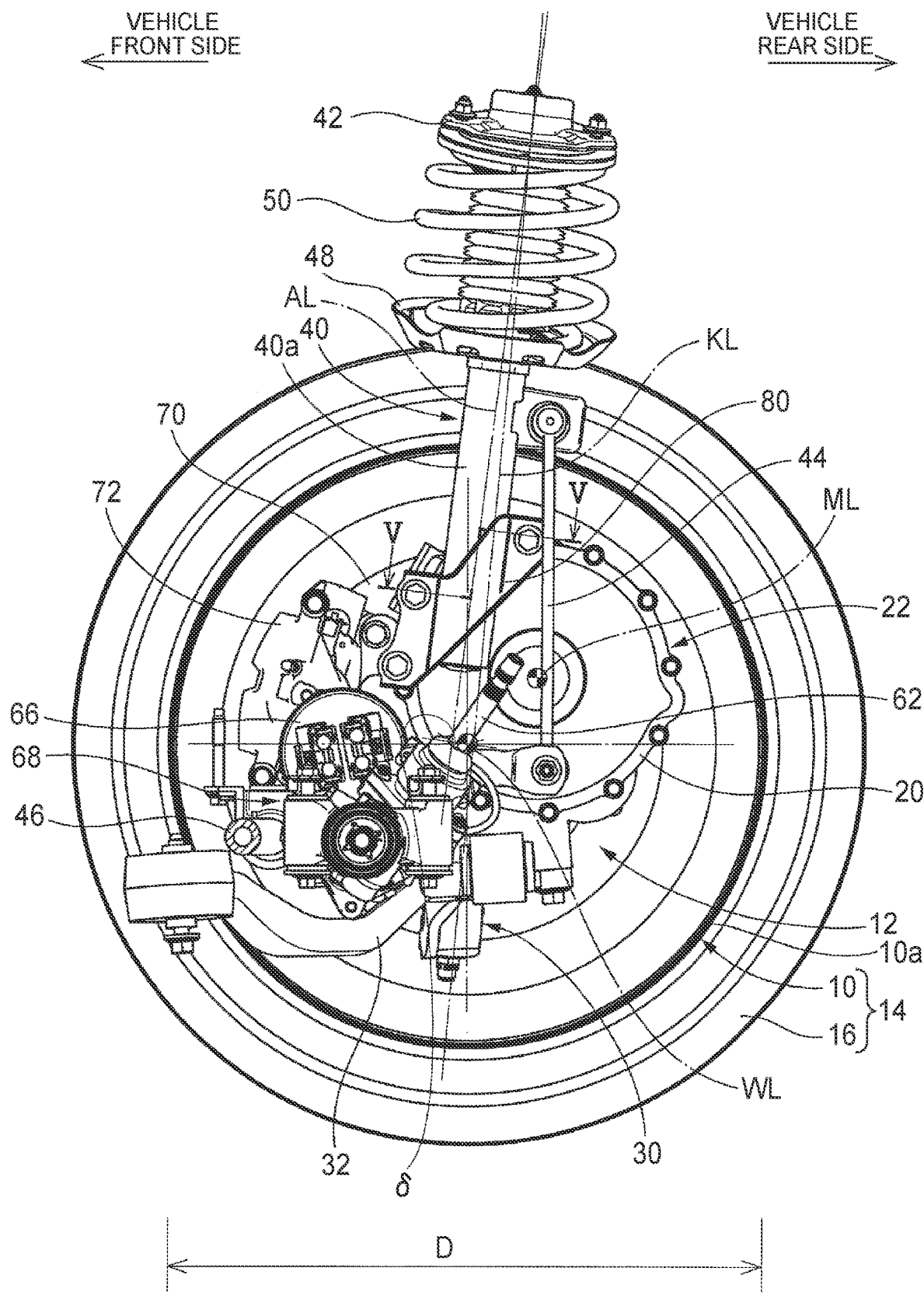
FIG. 1 is a side view of a vehicle suspension having an in-wheel motor unit coupling structure of an embodiment when viewed from a vehicle center side in a vehicle width direction.
Figure 2:
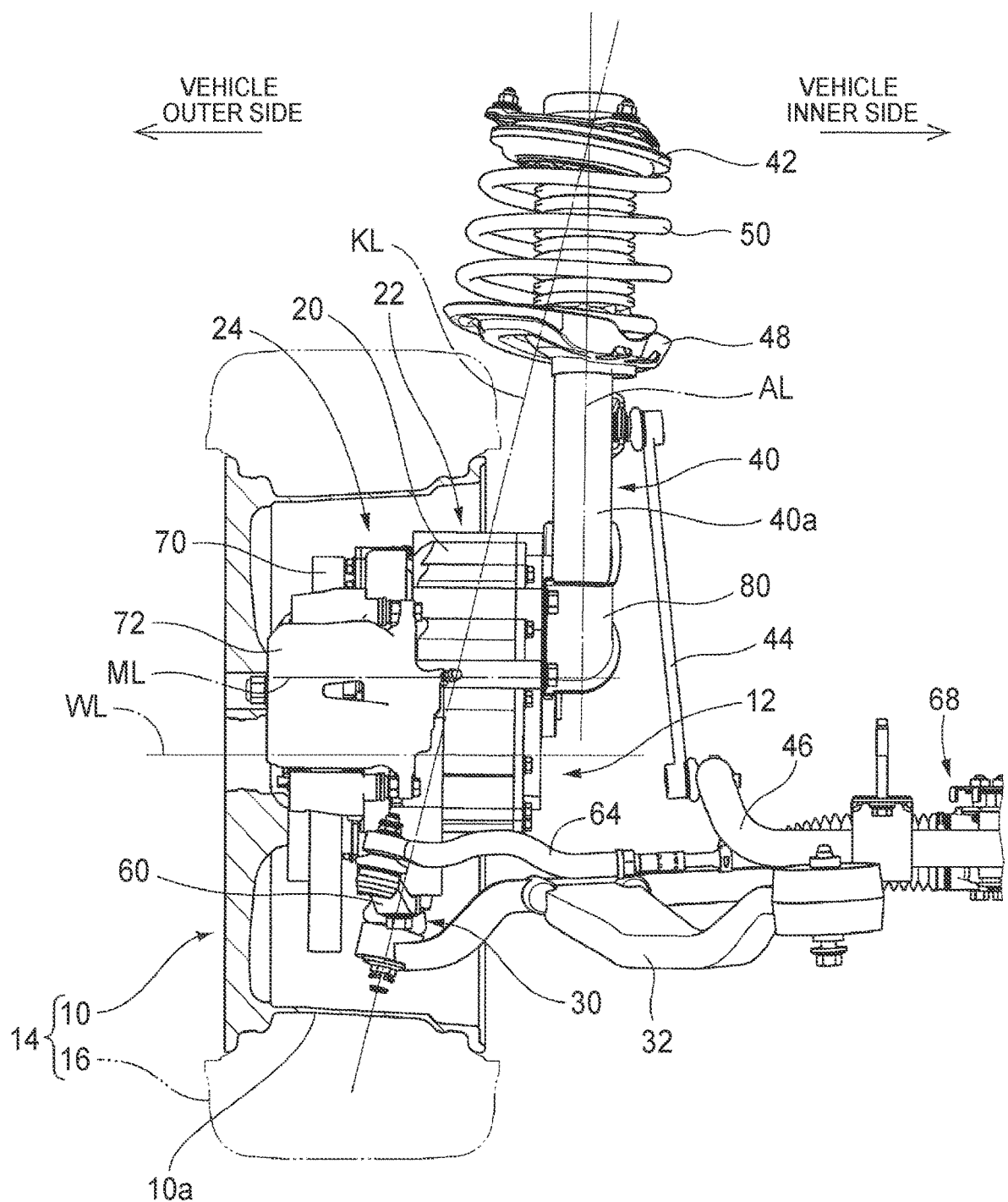
FIG. 2 is a front view of the vehicle suspension shown in FIG. 1 when viewed from a vehicle front side.
Figure 3:
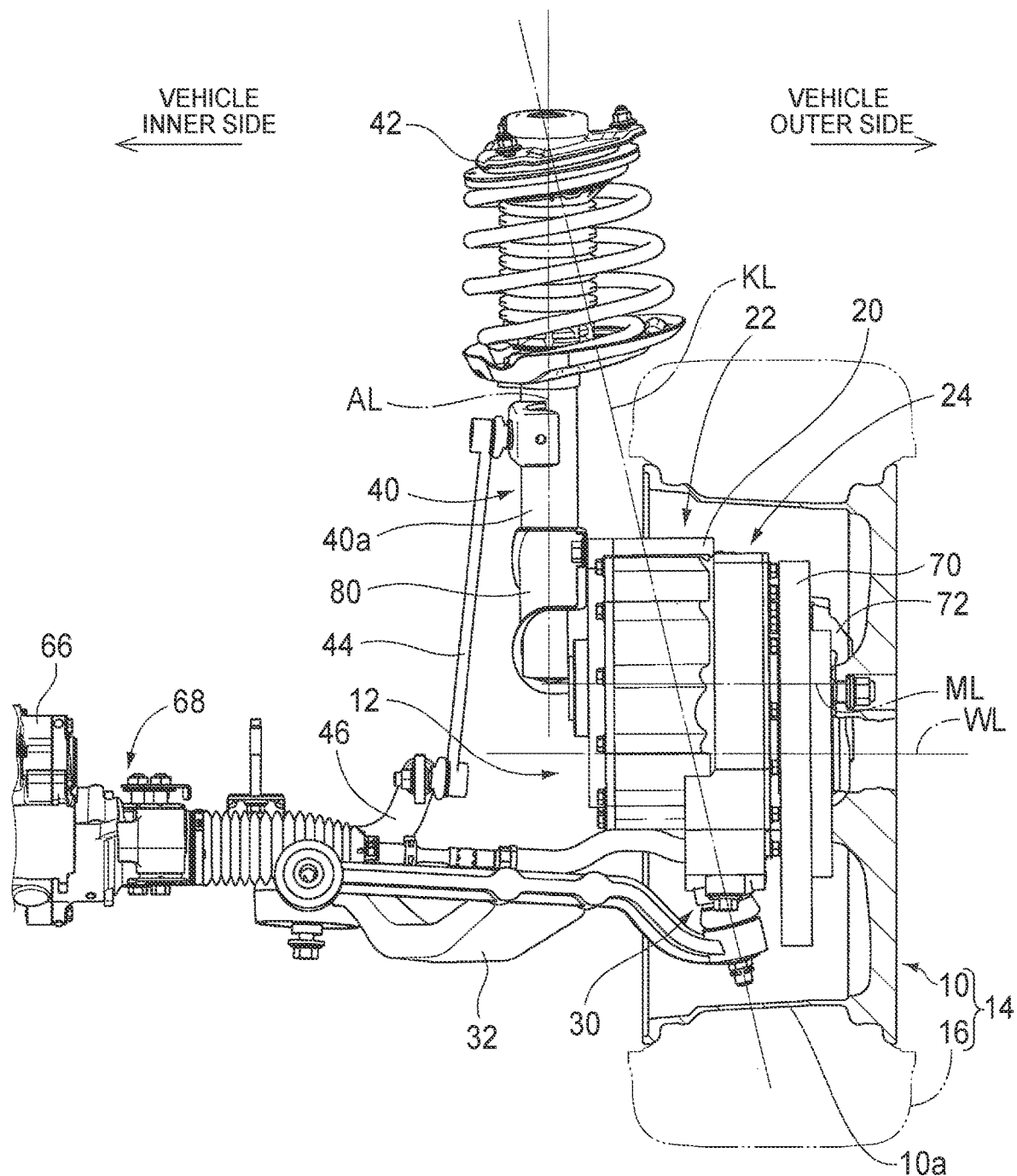
FIG. 3 is a back view of the vehicle suspension shown in FIG. 1 when viewed from a vehicle rear side.
Figure 4:
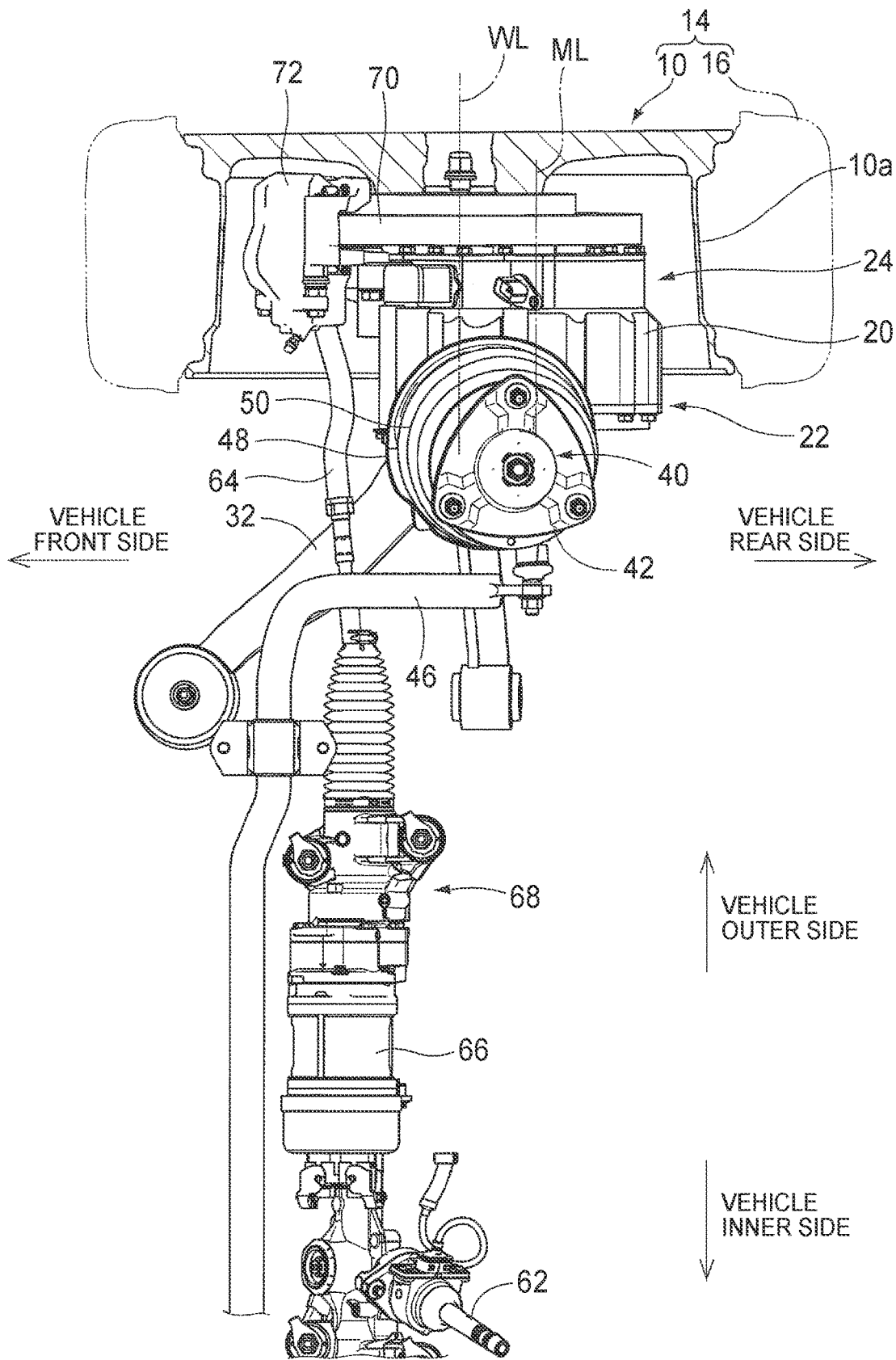
FIG. 4 is a plan view of the vehicle suspension shown in FIG. 1 when viewed from above.

A suspension having the coupling structure of the embodiment and shown in FIG. 1 to FIG. 4 (hereinafter, which may be referred to as suspension of the embodiment) is a strut (MacPherson-type) suspension. The suspension is a suspension for a right front wheel that functions as a steer wheel in a vehicle. FIG. 1 is a side view of the suspension when viewed from a vehicle center side in a vehicle width direction (which may be referred to as vehicle side view). FIG. 2 is a front view of the suspension when viewed from a vehicle front side. FIG. 3 is a back view of the suspension when viewed from a vehicle rear side. FIG. 4 is a plan view of the suspension when viewed from above. Hereinafter, the overall configuration of the suspension of the embodiment will be described with reference to those drawings. In the following description, as shown in the drawings, a forward direction in a vehicle front and rear direction is referred to as vehicle front side, a rearward direction in the vehicle front and rear direction is referred to as vehicle rear side, a direction toward the center of the vehicle in the vehicle width direction is referred to as vehicle inner side, and a direction toward the outer side of the vehicle in the vehicle width direction is referred to as vehicle outer side.

The suspension of the embodiment includes an in-wheel motor unit 12 disposed inside a wheel 10, more specifically, a rim 10a of the wheel 10. The unit 12 functions as a carrier that supports a tire-wheel assembly 14 such that the tire-wheel assembly 14 is rotatable around a wheel rotation axis WL by supporting the wheel 10 with an axle hub (hidden and not shown in the drawing) and that permits the up and down motion of the tire-wheel assembly 14 with respect to a vehicle body according to bounding or rebounding of the tire-wheel assembly 14 and the vehicle body. The tire-wheel assembly 14 is a component including the wheel 10 and a tire 16 fitted to the wheel 10.

The unit 12 includes an electric motor, a bearing unit, and a speed reducer inside a housing 20. The electric motor serves as a rotational driving source of the wheel 10, that is, the tire-wheel assembly 14. The bearing unit supports the axle hub. The speed reducer reduces the speed of rotation of the electric motor and transmits the rotation to the axle hub. On the assumption that the electric motor and part of the housing 20 accommodating the electric motor make up a motor part 22 and the speed reducer and part of the housing 20 accommodating the speed reducer make up a speed reducer part 24, a motor axis ML that is the axis of the electric motor is shifted toward the vehicle rear side from the wheel rotation axis WL, and the motor part 22 is offset from the wheel rotation axis WL in the vehicle front and rear direction, more specifically, toward the vehicle rear side. The motor part 22 is also offset upward from the wheel rotation axis WL.

The unit 12 is supported by A-shaped lower arm 32 via a ball joint 30 at its lower side. On the other hand, a shock absorber 40 is coupled to the unit 12 at the upper side of the unit 12. More specifically, the motor part 22 of the unit 12 and a lower end portion of the shock absorber 40 are fastened to each other. A coupling structure for coupling the unit 12 and the shock absorber 40 to each other is the coupling structure of the embodiment, and the details of the coupling structure will be described later.

The shock absorber 40 includes an outer cylinder 40a and a piston rod. The outer cylinder 40a accommodates a piston. The piston rod extends upward from the outer cylinder 40a. An upper end portion of the shock absorber 40, that is, an upper end portion of the piston rod, is rotatably supported by an upper support 42 connected to a mount portion of the vehicle body. Therefore, the unit 12 is pivotable around a kingpin axis KL that is determined by the ball joint 30 and the upper support 42. When the axis of the shock absorber 40 is defined as absorber axis AL, the kingpin axis KL does not match the absorber axis AL.

One end portion of a stabilizer bar (torsion bar) 46 is coupled to the outer cylinder 40a of the shock absorber 40 via a link rod 44. A spring lower seat 48 is connected to the outer cylinder 40a. A suspension coil spring 50 is disposed such that both ends are supported by the spring lower seat 48 and the upper support 42.

A knuckle arm 60 is connected to the housing 20 of the unit 12 at the lower side of the vehicle front side. On the other hand, in the vehicle, a wheel steering rod (hidden and not shown in the drawing) having a rack is disposed so as to extend in the vehicle width direction. The wheel steering rod is coupled to a steering shaft and moves rightward or leftward by the rotation of a pinion shaft 62 having a pinion meshed with the rack, that is, the rotational operation of a steering wheel. One end of the wheel steering rod is coupled to the distal end of the knuckle arm 60 via the link rod 64. The vehicle includes the thus configured steering system. As a result of driver's steering operation, the unit 12 pivots around the kingpin axis KL, and the tire-wheel assembly 14 supported by the unit 12 is turned. With such a structure, the unit 12 functions as a steering knuckle. The vehicle includes a wheel steering actuator 68 that uses an electric motor 66 as a driving source in order to assist the wheel steering rod in moving rightward or leftward.

The unit 12 supports a brake disc 70 together with the wheel 10 on the axle hub such that the brake disc 7 and the wheel 10 are rotatable. A brake caliper 72 made up of a brake pad and an actuator for pressing the brake pad against the brake disc 70 is also supported by the unit 12. Since the motor part 22 of the unit 12 is disposed inside the wheel 10 so as to be shifted toward the vehicle rear side, relatively large space is present inside the wheel 10. The brake caliper 72 is placed in this space inside the wheel 10 with sufficient room.

Coupling Structure for Shock Absorber and In-Wheel Motor Unit

Figure 5:
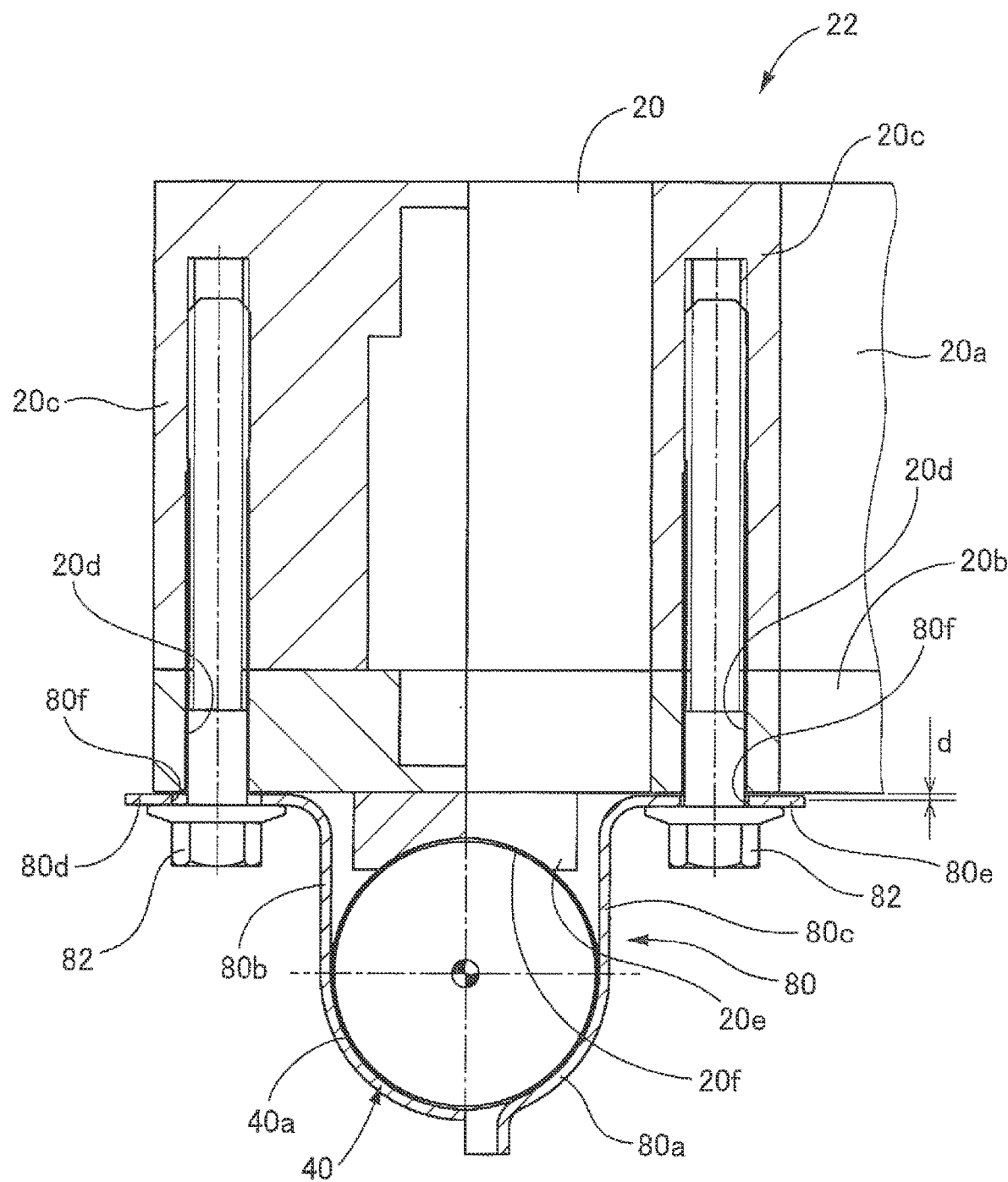
FIG. 5 is a cross-sectional view taken along the line V-V in FIG. 1 for illustrating a specific manner of fastening an in-wheel motor unit and a shock absorber to each other in the in-wheel motor unit coupling structure of the embodiment.

The coupling structure of the present embodiment will be described also with reference to FIG. 5. The shock absorber 40 is fastened to the unit 12, more specifically, the unit 12 on the vehicle center side, in the vehicle width direction, of the motor part 22, by using a bracket 80 that is a fastening member. The bracket 80 is made by forming a plate material into a shape having substantially a U-shape in cross section. A portion 80a corresponding to the bottom of the U-shape (hereinafter, which may be referred to as proximal portion) is joined with the lower end portion of the shock absorber 40, more specifically, the lower end portion of the outer cylinder 40a, by welding. The bracket 80 has a pair of extended portions 80b, 80c extending from the proximal portion 80a toward the motor part 22 substantially parallel to each other. The extended portions 80b, 80c are respectively bent at their distal ends to provide flanges 80d, 80e as extended end portions. Two mounting holes 80f are perforated in the vehicle front-side flange 80d, and a single mounting hole 80f is perforated in the vehicle rear-side flange 80e.

On the other hand, the housing 20 of the unit 12 includes a peripheral wall 20a and a lid 20b in the motor part 22. The lid 20b is connected by bolts so as to surround the vehicle inner side of the space surrounded by the peripheral wall 20a. The peripheral wall 20a has mounting bosses 20c each having an internal thread, in correspondence with the mounting holes 80f perforated in the flanges 80d, 80e of the bracket 80. The lid 20b has through-holes 20d in correspondence with the mounting holes 80f. The bracket 80 is fastened to the motor part 22 by bolts 82. The bolts 82 serve as fasteners extending through the mounting holes 80f of the flanges 80d, 80e and the through-holes 20d of the lid 20b and screwed to the internal threads of the mounting bosses 20c.

A mounting seat 20e is fixedly provided on the lid 20b. The groove 20f has a U-shape in cross section and extends in a direction parallel to the absorber axis AL. The outer cylinder 40a of the shock absorber 40 is just fitted to the groove 20f.

In a state where the lower end portion of the shock absorber 40 is connected to the motor part 22 but the bolts 82 have not been tightened yet, a slight gap d is present between each of the flanges 80d, 80e and the surface of the lid 20b. When the bolts 82 are tightened into the mounting bosses 20c, the extended portions 80b, 80c are elastically stretched, with the result that the gap d disappears. In other words, the bracket 80 is elastically deformed, and the lower end portion of the shock absorber 40 is pressed against the motor part 22 of the unit 12, more specifically, the mounting seat 20e, toward the vehicle outer side in the vehicle width direction by a reaction force caused by the elastic deformation. In the pressed state, the positional variations of the shock absorber 40 in a direction perpendicular to the absorber axis AL, generally, the vehicle front and rear direction, are prohibited by the groove 20f of the mounting seat 20e.

In the above-described suspension, as described above, the motor axis ML that is the axis of the electric motor is shifted from the wheel rotation axis WL toward the vehicle rear side, and the motor part 22 is offset from the wheel rotation axis WL in the vehicle front and rear direction, more specifically, toward the vehicle rear side. With the coupling structure of the embodiment, since the lower end portion of the shock absorber 40 is fastened to the vehicle center side of the motor part 22 in the vehicle width direction, space for disposing the brake caliper 72, and the like, that are other elements to be disposed inside the wheel 10, is less limited, so work, such as maintenance of the brake caliper 72, and the like, can be relatively easily performed.

In the coupling structure of the embodiment, the lower end portion of the shock absorber 40 is fastened to the vehicle center side of the motor part 22 in the vehicle width direction, so the absorber axis AL can be brought close to the wheel rotation axis WL. Specifically, in a state where the tire-wheel assembly 14 is not turned, an offset amount δ of the absorber axis AL from the wheel rotation axis WL in the vehicle side view is less than or equal to $\frac{1}{5}$ of the outside diameter D of the wheel 10 (actually, almost not offset). As a result, a force that acts on the shock absorber 40 in a direction that intersects with the absorber axis AL (for example, a force that acts to bend the shock absorber 40) is relatively reduced.

In addition, the rotation radius of the lower end portion of the shock absorber 40 around the kingpin axis KL at the time of turning the tire-wheel assembly 14 is relatively small, so space for avoiding interference with vehicle body-side components, or the like, may be relatively small.

With the coupling structure of the embodiment, the lower end portion of the shock absorber 40 is fastened to the motor part 22 of the unit 12 so as to be pressed against the motor part 22. In other words, the lower end portion of the shock absorber 40 is fastened so as to be in close contact with the motor part 22 directly, that is, the mounting seat 20e that is a component of the motor part 22. For this reason, the shock absorber 40 and the unit 12 are firmly coupled. A force that acts on the shock absorber 40 is received not only via the bracket 80 but also by the unit 12 directly, so the stiffness of the coupling structure is sufficiently ensured, and reliability on the strength of the coupling structure is high.

Figure 6:
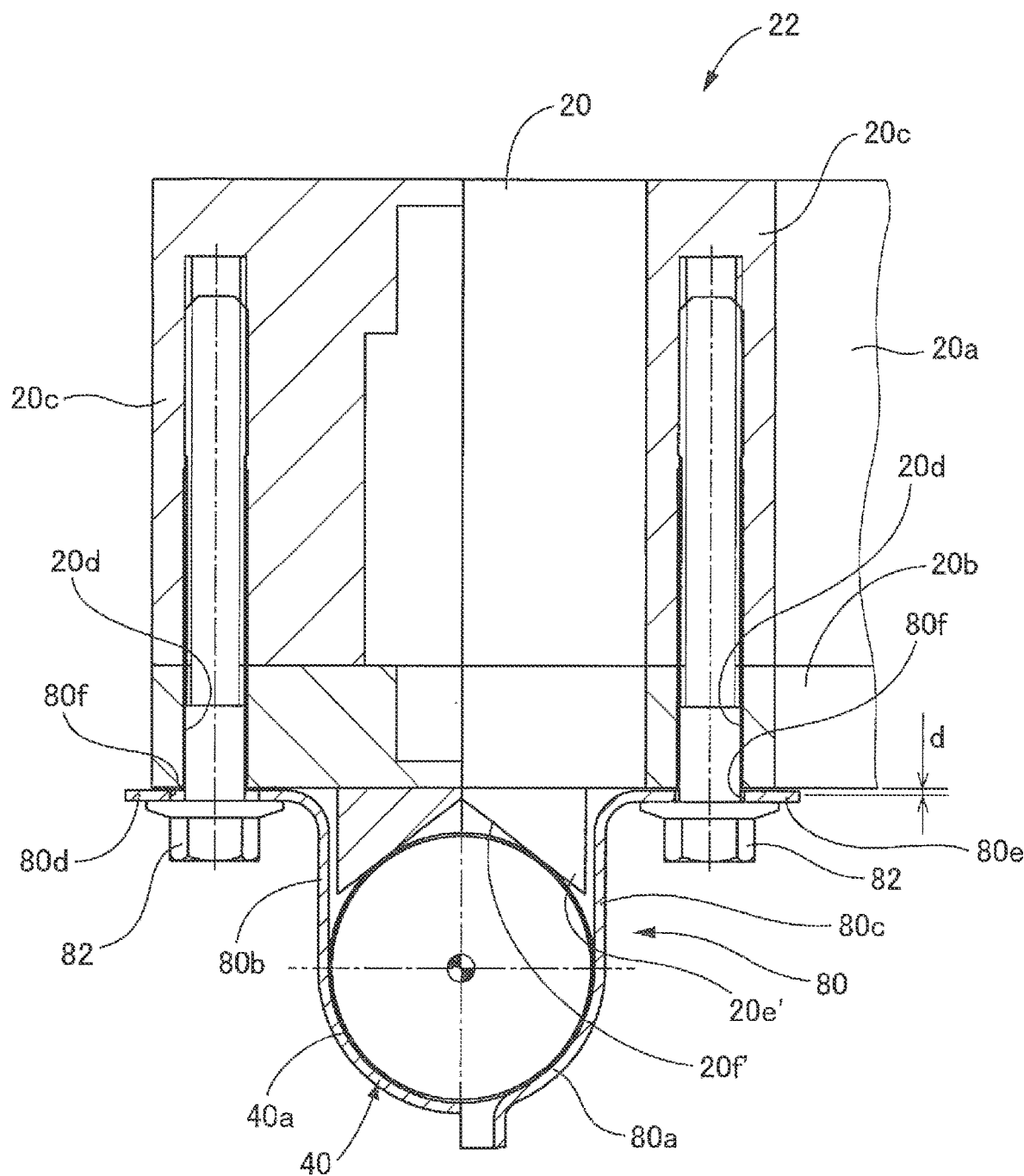
FIG. 6 is a cross-sectional view taken along the line V-V in FIG. 1 for illustrating a specific manner of fastening an in-wheel motor unit and a shock absorber to each other in an in-wheel motor unit coupling structure of a modification.

As a modification related to the mounting seat 20e, as shown in FIG. 6, instead of the U-shaped groove 20f, a mounting seat 20e' having a V-shaped groove 20f in cross section may be provided. With such the groove 20f, in a state where the lower end portion of the shock absorber 40 is pressed against the mounting seat 20e, the positional variations of the shock absorber 40 in a direction perpendicular to the absorber axis AL, generally, in the vehicle front and rear direction, are prohibited.

Figure 7A:
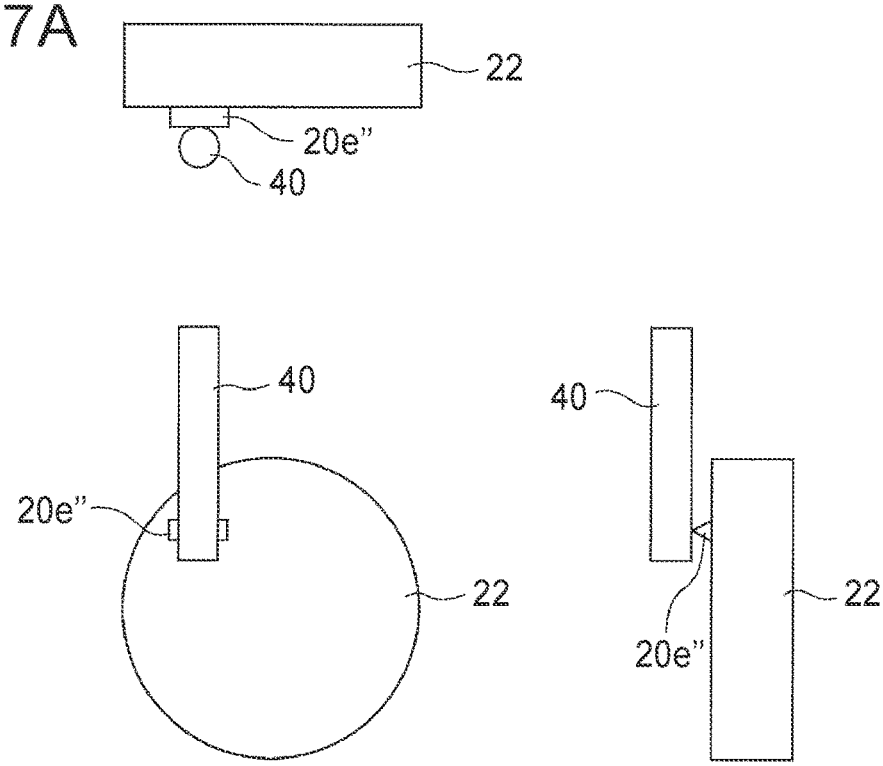
FIG. 7A and FIG. 7B each are a schematic three-plan drawing for illustrating a specific manner of fastening an in-wheel motor unit and a shock absorber to each other in an in-wheel motor unit coupling structure of another modification.
Figure 7B:
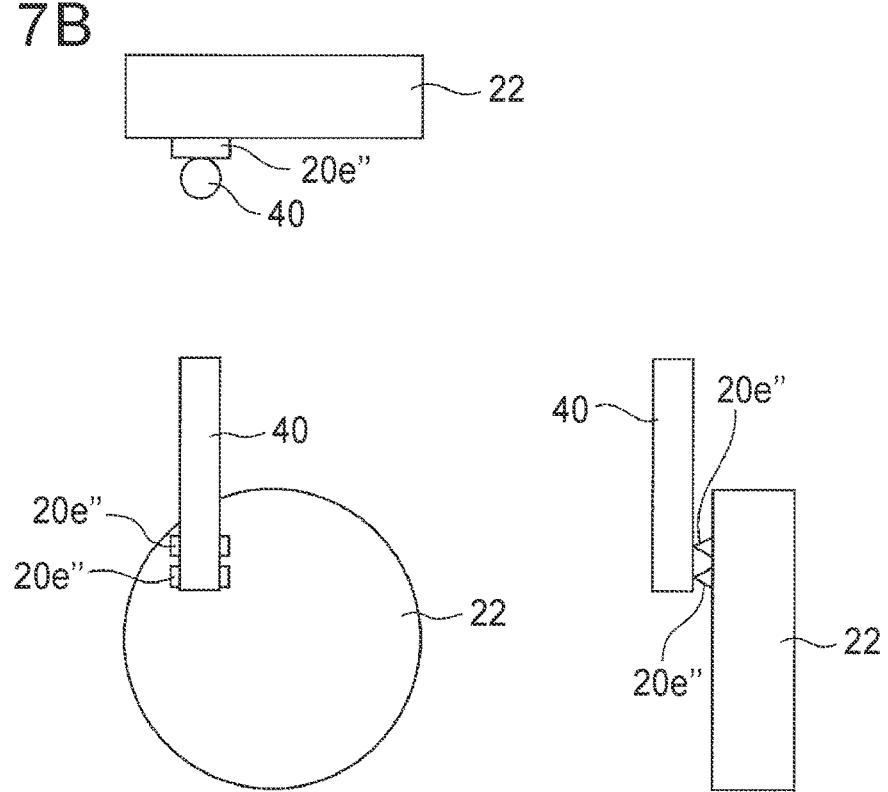

As schematically shown by the three-plan drawings in FIG. 7A and FIG. 7B, for example, a mounting seat 20e" having substantially a triangular cross section and extending in a direction to make a grade separated crossing perpendicularly to the absorber axis AL may be provided one or two in the motor part 22.

What is claimed is:

1. An in-wheel motor unit coupling structure comprising:
an in-wheel motor unit disposed inside a wheel of a vehicle, the in-wheel motor unit being configured to support the wheel such that the wheel is rotatable, the in-wheel motor unit including an electric motor that is a rotational driving source of the wheel; and
a shock absorber coupled to the in-wheel motor unit, the shock absorber being a component of a vehicle suspension, a lower end portion of the shock absorber being fastened to a vehicle center side, in a vehicle width direction, of a motor part so as to be pressed against the motor part outward from the vehicle in the vehicle width direction, the motor part accommodating the electric motor of the in-wheel motor unit,
wherein:
the lower end portion of the shock absorber and the motor part are fastened to each other by a fastening member;
the lower end portion of the shock absorber is configured to be pressed against the motor part by an elastic reaction force of the fastening member;
the fastening member includes a bracket partially joined with the lower end portion of the shock absorber and extending toward the motor part;
when an extended end portion of the bracket is fastened to the motor part, the lower end portion of the shock absorber is fastened to the motor part; and
in a state where the lower end portion of the shock absorber is fastened to the motor part, the bracket is elastically deformed, and the lower end portion of the shock absorber is configured to be pressed against the motor part by a reaction force caused by an elastic deformation.

2. An in-wheel motor unit coupling structure comprising:
an in-wheel motor unit disposed inside a wheel of a vehicle, the in-wheel motor unit being configured to support the wheel such that the wheel is rotatable, the in-wheel motor unit including an electric motor that is a rotational driving source of the wheel; and
a shock absorber coupled to the in-wheel motor unit, the shock absorber being a component of a vehicle suspension, a lower end portion of the shock absorber being fastened to a vehicle center side, in a vehicle width direction, of a motor part so as to be pressed against the motor part outward from the vehicle in the vehicle width direction, the motor part accommodating the electric motor of the in-wheel motor unit,
wherein:
the motor part is placed so as to be offset in a vehicle front and rear direction with respect to a rotation axis of the wheel; and
an amount of offset of an axis of the shock absorber in side view of the vehicle from the rotation axis of the wheel is less than or equal to $\frac{1}{5}$ of an outside diameter of the wheel.

* * * * *